United States Patent [19]
Guignard et al.

[11] Patent Number: 5,211,426
[45] Date of Patent: May 18, 1993

[54] POINT IRRIGATION APPARATUS WITH BRANCH CONNECTIONS

[75] Inventors: René J. Guignard, St. Egreve; Jean Garcia, Charavines, both of France

[73] Assignee: Hutchinson, Paris, France

[21] Appl. No.: 587,691

[22] Filed: Sep. 25, 1990

[30] Foreign Application Priority Data

Sep. 29, 1989 [FR] France ................ 89 12742

[51] Int. Cl.⁵ .................................... F16L 55/00
[52] U.S. Cl. ................................ 285/5; 285/93; 285/192; 285/423; 405/43
[58] Field of Search ............... 285/5, 93, 189, 423, 285/192; 604/411; 405/43, 45

[56] References Cited

U.S. PATENT DOCUMENTS

| | | | |
|---|---|---|---|
| 2,402,781 | 6/1946 | Schreiber | 285/192 X |
| 2,653,606 | 9/1953 | Ryan | 204/415 X |
| 3,361,363 | 1/1968 | Babington | |
| 3,447,570 | 6/1969 | Collins | 285/93 X |
| 3,752,505 | 8/1973 | Stout | 285/5 |
| 3,850,202 | 11/1974 | Morgan | 285/93 X |
| 3,966,233 | 7/1976 | Diggs | 285/5 X |
| 3,973,732 | 8/1976 | Diggs | 285/5 X |
| 3,990,445 | 11/1976 | Lundquist | 285/93 X |
| 4,044,443 | 8/1977 | Charlet | 285/192 X |
| 4,214,779 | 7/1980 | Losell | 285/423 X |
| 4,892,222 | 1/1990 | Schmidt et al. | 604/415 |

FOREIGN PATENT DOCUMENTS

| | | |
|---|---|---|
| 0002336 | 6/1979 | European Pat. Off. . |
| 0063089 | 10/1982 | European Pat. Off. . |
| 2257053 | 1/1975 | France . |
| 2503534 | 4/1981 | France . |

*Primary Examiner*—Dave W. Arola
*Assistant Examiner*—Heather Chun
*Attorney, Agent, or Firm*—Lowe, Price, LeBlanc & Becker

[57] ABSTRACT

Irrigation apparatus comprising, in combination, a main water feed pipe made of elastically deformable material and at least one branch including a needle having a sharp end and sufficiently stiff to be capable of being connected to the main pipe by being forced through the wall thereof, wherein a portion of the inside surface of the wall of the main pipe includes an extra thickness of a resiliently deformable rubber material of hardness which is much less than that of the material constituting the wall of the pipe and which is suitable for sealing orifices formed through its bulk.

16 Claims, 1 Drawing Sheet

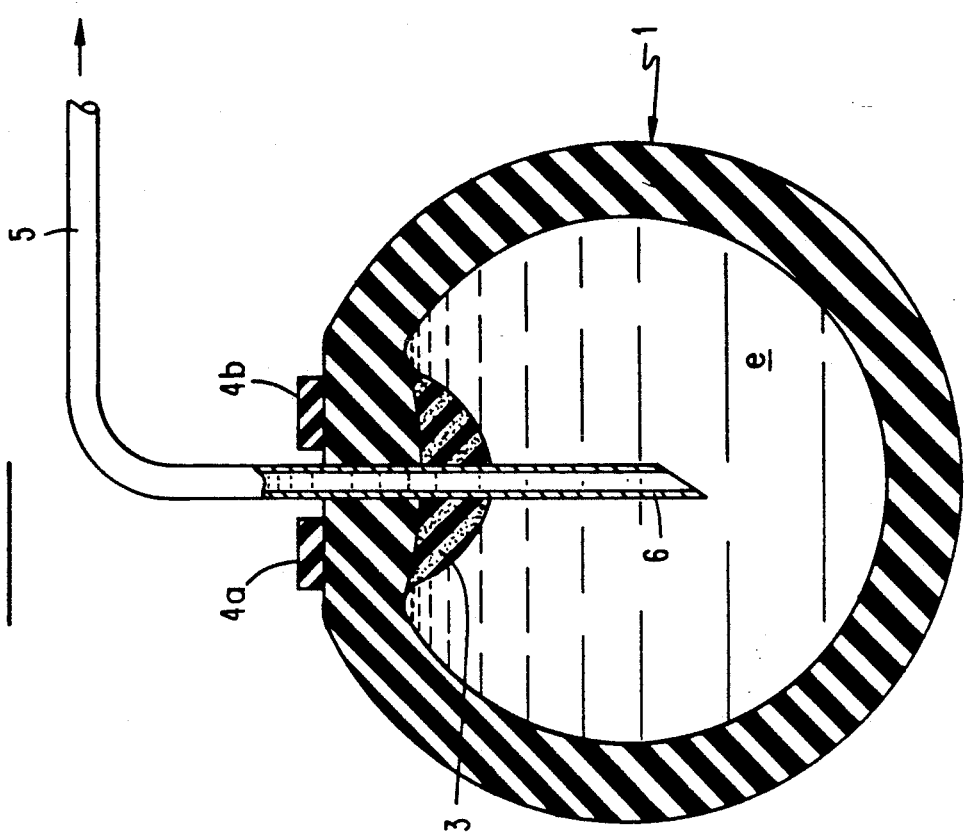
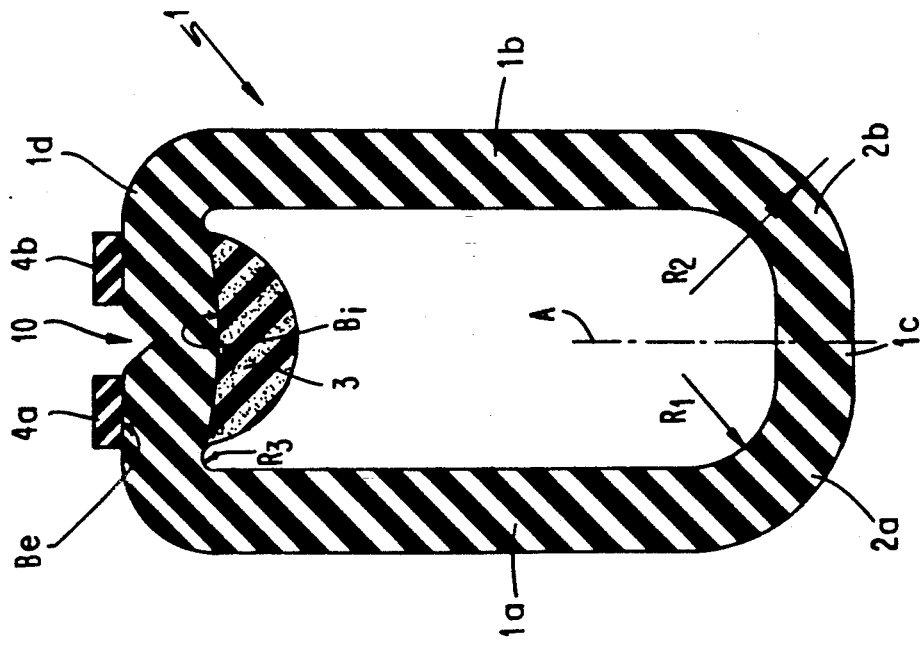

POINT IRRIGATION APPARATUS WITH BRANCH CONNECTIONS

The present invention relates to apparatus for ground irrigation systems.

BACKGROUND OF THE INVENTION

More particularly, the invention relates to such irrigation systems known by the terms "point irrigation", "localized irrigation", or "drop by drop irrigation", whereby water is brought to the desired utilization point(s) in very small quantities so as to obtain optimum moistness with minimum water consumption. The apparatus used for this purpose are generally both complex in structure and thus expensive, and highly specific in the use to which they can be put because the water dispensing orifices are generally at a fixed spacing.

To obviate these drawbacks, French patent application FR-81 07317, filed Apr. 9, 1981, discloses apparatus comprising a main feed pipe made of elastically deformable material and a series of branches suitable for being connected merely by being forced into any point along at least one longitudinal portion of the main pipe which has a specially adapted cross-section such that when a branch is removed, the resilient compression forces in the substance from which the main pipe is made seal the passage which was opened by penetration of the branch.

Although this apparatus does indeed give satisfaction, its use requires the ends of the branches that are connected to the main pipe to be constituted by metal needles. This can sometimes lead to the apparatus leaking while in use where the branches are inserted because the metal needles heat up (particularly during periods of drought when these apparatuses are most used), thereby deteriorating the resilience of the substance from which the main pipe is made in the vicinity of the perforations, in particular when said substance is an elastomer of the rubber type.

A general object of the invention is to provide irrigation apparatus of the above-mentioned type which mitigates the drawbacks of known devices and in particular in which water-tightness is not degraded during successive periods of use.

SUMMARY OF THE INVENTION

To this end, irrigation apparatus comprises, in combination, a main water feed pipe made of elastically deformable material and at least one branch including a needle having a sharp end and sufficiently stiff to be capable of being connected to the main pipe by being forced through the wall thereof. A portion of the inside surface of the wall of said main pipe includes an extra thickness of a resiliently deformable rubber material of hardness which is much less than that of the material constituting the wall of the pipe and has self-sealing properties.

In a preferred embodiment of the invention, the material from which said extra thickness is made is bromobutyl rubber.

In one implementation of such a preferred embodiment, the cross-section of the main pipe in the absence of internal pressure is somewhat in the shape of a rectangle having rounded corners, with one of the short sides thereof being provided on its inside face with said extra thickness and with the outside face of the same side having a slight depression identifying the lengthwise zone of the pipe in which the needle(s) of the branch(es) must be inserted.

The depression may be bordered, along the pipe and in the vicinity of the longitudinal edges of the depression, by two parallel ribs disposed symmetrically about the longitudinal mean plane of the pipe, which ribs contribute to identifying the zone where branch needles should be inserted.

In an advantageous embodiment, the entire main pipe is symmetrical in structure about the mean longitudinal plane of the pipe, such that said extra thickness is also symmetrical about said mean plane.

The cross-section of the extra thickness when the pipe is not subjected to stress, i.e. before being put under pressure, may be in the form of a lightly crescent-shaped segment of a circle.

In a most particularly preferred embodiment of the invention, the pipe is made of EPDM type rubber having a hardness of about 70 on the Shore A scale, and the extra thickness is made of bromobutyl rubber having a hardness of about 40 on the Shore A scale, these two materials and the external ribs, if any, delimiting the depression identifying the zone into which needles are to be inserted, and being coextruded during pipe manufacture.

BRIEF DESCRIPTION OF THE DRAWING

An embodiment of the invention is described by way of example with reference to the accompanying drawing, in which:

FIG. 1 is a view of a main pipe for irrigation apparatus of the invention shown in cross-section on a plane perpendicular to the axis of the pipe and in its configuration prior to being put under pressure; and FIG. 2 is a cross-section on the same plane as FIG. 1, but showing its configuration in use.

DETAILED DESCRIPTION

Reference is made initially to FIG. 1 which shows a main pipe 1 made of a resiliently deformable material, e.g. a relatively hard EPDM rubber (70 on the Shore A scale), which is shaped, as shown in the figure which shows the pipe prior to being put under pressure, so as to have a cross-section which is substantially rectangular in general shape with rounded corners, two long sides 1a and 1b, and a short side 1c of the same constant thickness as the long sides and connected thereto via rounded link zones 2a and 2b having relatively large inside and outside radii of curvature R1 and R2 respectively. The cross-section of the pipe is closed by a short side 2d having the same length as the side 1c and connected to the long sides 1a and 1b by rounded portions having an outside radius of curvature close to R1 but a much smaller inside radius of curvature R3.

As clearly visible in FIG. 1, the side 1d which defines a substantially plane outside surface Be for the pipe when in its non-operating condition includes a depression or groove 10 with a substantially V-shaped cross-section, and the inside face Bi of the pipe in the zone corresponding to its side 1d is slightly curved so as to be convex facing the inside of the pipe.

The inside surface Bi of the pipe is covered by an extra thickness or bulge having a substantially semi-cylindrical outside surface and made of flexible rubber material which is very resilient and much less hard than that used for the piper per se, and which has the property of retaining its flexibility over a wide range of temperatures, of neither hardening nor cracking under the effects of heat, of extreme cold, or over time, and of being totally inert both chemically and physically, i.e. being insensitive to attack by organic or inorganic impurities in the water, such that the impurities can neither remove substance from it nor attach themselves to it.

A material which is particularly suitable and which has given good results is constituted by bromobutyl rubber which provides satisfactory watertightness to the apparatus even when the material from which the pipe 1 is made has lost some of its watertightness characteristics in the zone through which the metal needles at the ends of the branches have repeatedly been inserted following repeated use.

In order to ensure that said needles are inserted into the main pipe specifically through those portions that are lined on its inside surface by the extra thickness 3, two longitudinal ribs 4a and 4b are provided on the outside surface corresponding to the side 1d in a symmetrical disposition on either side of the longitudinal plane of symmetry A of the pipe. The ribs 4a and 4b may also be made of a rubber material which may be the same or different in type from that constituting the pipe 1 or the extra thickness 3.

In a preferred embodiment of the invention, the ribs are advantageously bulk colored to distinguish them more clearly from the remainder of the pipe which is generally black in color, thereby further facilitating identifying the zone into which branch needles should be inserted.

One such needle 6 forming the end of a tubular branch 5 is shown in FIG. 2 which shows the apparatus in its configuration when in use with the pipe 1 having a cross-section which is substantially circular under the effect of the pressure of the water e which is contained in the pipe 1 and which is to be dispensed via the branches 5.

When the metal needle 6 of the branch 5 is withdrawn, the zone of the pipe through which said needle used to pass returns to its initial condition, and by a self-sealing effect it prevents any water escaping through the previously punctured zone.

The extra thickness 3 lining the inside of the pipe contributes efficiently to the sealing by virtue of its high degree of flexibility and its high degree of resilience, with these characteristics even compensating, where necessary, for a relative loss of watertightness in the pipe 1 per se, e.g. due to the pipe aging.

In one embodiment that has given satisfaction, in particular with respect to suitability for long-term use over several seasons or irrigation campaigns, the tube 1 was made of EPDM rubber having a cross-section in the form of a rectangle with rounded corners, with the long sides of the section being about 15 mm long, the short sides of the section being about 8 mm long, the thickness of the pipe being about 1.5 mm, the radii of curvature R1, R2, being respectively 1.7 mm and 3.2 mm and with the thickness of the bromobutyl rubber bulge 3 being about 2 mm in front of the groove 10.

We claim:

1. Irrigation apparatus comprising, in combination, a main agricultural irrigation water feed pipe made of elastically deformable material including a passageway for carrying irrigation fluid, and at least one branch including a needle having a sharp end connected to the main pipe by being forced through the wall thereof, wherein an inside surface of the wall includes at least one portion of extra thickness which projects into the passageway from the inside surface of a resiliently deformable material of a hardness which is less than that of the material forming the wall of the pipe and which material of said extra thickness is suitable for sealing orifices formed through its bulk by the needle extending therethrough.

2. Irrigation apparatus according to claim 1, wherein substantially the entire length of the main pipe is symmetrical in structure about a mean longitudinal plane of the pipe, such that said extra thickness is also symmetrical about said mean longitudinal plane.

3. Irrigation apparatus according to claim 1, wherein said extra thickness portion adheres to the inside surface of the wall.

4. Apparatus of claim 1, wherein said extra thickness portion extends radially inwardly from the wall as well as radially inwardly relative to a plane through which extend portions of the pipe located longitudinally adjacent the wall.

5. Apparatus of claim 1, wherein said branch is further tubing material interconnected through the needle to the feed pipe to receive water therefrom for delivery to a location.

6. Irrigation apparatus comprising in combination:
   a main agricultural irrigation water feed pipe, the wall of which is made of a first elastically deformable material of a first hardness including a passageway for carrying irrigation fluid; an inside surface of the wall being provided with at least one portion of extra thickness of a second resiliently deformable material of a second hardness which projects into the passageway from the inside surface, said second hardness being much less than said first hardness and said second material being suitable for sealing orifices formed through its bulk by a needle;
   a least one branch including said needle having a sharp end being forced through the wall thereof and through said portion of extra thickness.

7. Apparatus of claim 6, wherein said extra thickness portion extends radially inwardly from the wall as well as radially inwardly relative to a plane through which extend portions of the pipe located longitudinally adjacent the wall.

8. Apparatus of claim 6, wherein said branch is further tubing material interconnected through the needle to the feed pipe to receive water therefrom for delivery to a location.

9. Irrigation apparatus comprising, in combination, a main water feed pipe made of elastically deformable material, and at least one branch including a needle, having a sharp end connected to the main pipe by being forced through the wall thereof, wherein an inside surface of the wall includes at least one portion of extra thickness of a resiliently deformable material of a hardness which is less than that of the material forming the wall of the pipe and which material of said extra thickness is suitable for sealing orifices formed through its bulk by the needle extending therethrough, wherein the material from which said extra thickness is made is bromobutyl rubber.

10. Irrigation apparatus comprising, in combination, a main water feed pipe made of elastically deformable material, and at least one branch including a needle having a sharp end connected to the main pipe by being forced through the wall thereof, wherein an inside surface of the wall includes at least one portion of extra thickness of a resiliently deformable material of a hardness which is less than that of the material forming the wall of the pipe and which material of said extra thickness is suitable for sealing orifices formed through its bulk by the needle extending therethrough, wherein the cross-section of said main pipe in the absence of internal pressure is in the form of a rectangle having rounded corners, with one of the short sides of the rectangle being lined on its inside face with said extra thickness and with the outside face thereof having a depression for identifying the lengthwise zone of the pipe into which branch needle(s) should be inserted.

11. Irrigation apparatus comprising, in combination, a main water feed pipe made of elastically deformable material, and at least one branch including a needle having a sharp end connected to the main pipe by being forced through the wall thereof, wherein an inside surface of the wall includes at least one portion of extra thickness of a resiliently deformable material of a hardness which is less than that of the material forming the wall of the pipe and which material of said extra thickness is suitable for sealing orifices formed through its bulk by the needle extending therethrough, wherein the cross-section of said main pipe in the absence of internal pressure is in the form of a rectangle having rounded corners, with one of the short sides of the rectangle being lined on its inside face with said extra thickness and with the outside face thereof having a depression for identifying the lengthwise zone of the pipe into which branch needle(s) should be inserted, wherein the depression is bordered, along the pipe and in the vicinity of the longitudinal edges of the depression, by two generally parallel ribs disposed about the depression, which ribs contribute to identifying the zone where said branch needle is inserted.

12. Irrigation apparatus comprising, in combination, a main water feed pipe made of elastically deformable material, and at least one branch including a needle having a sharp end connected to the main pipe by being forced through the wall thereof, wherein an inside surface of the wall includes at least one portion of extra thickness of a resiliently deformable material of a hardness which is less than that of the material forming the wall of the pipe and which material of said extra thickness is suitable for sealing orifices formed through its bulk by the needle extending therethrough, wherein the cross-section of the extra thickness when the pipe is not subjected to stress, i.e. before it is put under pressure, is in the form of a sightly crescent-shaped segment of a circle.

13. Irrigation apparatus comprising, in combination, a main water feed pipe made of elastically deformable material, and at least one branch including a needle having a sharp end connected to the main pipe by being forced through the wall thereof, wherein an inside surface of the wall includes at least one portion of extra thickness of a resiliently deformable material of a hardness which is less than that of the material forming the wall of the pipe and which material of said extra thickness is suitable for sealing orifices formed through its bulk by the needle extending therethrough, wherein the pipe is made of EPDM rubber having a hardness of about 70 on the Shore A scale, and wherein the extra thickness is made of a bromobutyl rubber having a hardness of about 40 on the Shore A scale.

14. Irrigation apparatus comprising, in combination, a main water feed pipe made of elastically deformable material, and at least one branch including a needle having a sharp end connected to the main pipe by being forced through the wall thereof, wherein an inside surface of the wall includes at least one portion of extra thickness of a resiliently deformable material of a hardness which is less than that of the material forming the wall of the pipe and which material of said extra thickness is suitable for sealing orifices formed through its bulk by the needle extending therethrough, wherein the pipe and the extra thickness portion are coextruded members.

15. Irrigation apparatus comprising, in combination, a main water feed pipe made of elastically deformable material, and at least one branch including a needle having a sharp end connected to the main pipe by being forced through the wall thereof, wherein an inside surface of the wall includes at least one portion of extra thickness of a resiliently deformable material of a hardness which is less than that of the material forming the wall of the pipe and which material of said extra thickness is suitable for sealing orifices formed through its bulk by the needle extending therethrough, wherein the cross-section of the pipe is in the form of a rectangle having rounded corners with the length of its short sides being about 8 mm, its thickness being about 1.5 mm, its radii of curvature being about 1.7 mm and 3.2 mm respectively, and the thickness of the extra thickness portion is about 2 mm.

16. Irrigation apparatus comprising, in combination, a main water feed pipe made of elastically deformable material, and at least one branch including a needle having a sharp end connected to the main pipe by being forced through the wall thereof, wherein an inside surface of the wall includes at least one portion of extra thickness of a resiliently deformable material of a hardness which is less than that of the material forming the wall of the pipe and which material of said extra thickness is suitable for sealing orifices formed through its bulk by the needle extending therethrough, wherein said extra thickness portion and said pipe are coextruded members and said extra thickness portion thereby extends along substantially the entire length of said pipe.

* * * * *